United States Patent [19]
Shoji

[11] Patent Number: 6,067,293
[45] Date of Patent: May 23, 2000

[54] RECEIVER

[75] Inventor: Takashi Shoji, Tokyo, Japan

[73] Assignee: NEC Corporation, Japan

[21] Appl. No.: 08/988,530

[22] Filed: Dec. 10, 1997

[30] Foreign Application Priority Data

Dec. 11, 1996 [JP] Japan ..................... 8-330103

[51] Int. Cl.⁷ ............. H04B 7/216; H04B 15/00
[52] U.S. Cl. ............. 370/342; 370/320; 375/200
[58] Field of Search ................. 370/320, 335, 370/342, 479; 375/200, 208, 209, 210

[56] References Cited

U.S. PATENT DOCUMENTS

| | | | |
|---|---|---|---|
| 5,920,554 | 7/1999 | Nakamura et al. | 370/342 |
| 5,953,366 | 9/1999 | Naruse et al. | 370/335 |
| 5,953,382 | 9/1999 | Asano et al. | 370/342 |
| 5,956,367 | 9/1999 | Koo et al. | 370/335 |
| 5,974,038 | 10/1999 | Shou et al. | 370/320 |

FOREIGN PATENT DOCUMENTS

| | | |
|---|---|---|
| 63-40422 | 2/1988 | Japan . |
| 2-90828 | 3/1990 | Japan . |
| 2-271731 | 11/1990 | Japan . |
| 3-107840 | 11/1991 | Japan . |
| 6-77928 | 3/1994 | Japan . |
| 8-32548 | 2/1996 | Japan . |
| 8-116303 | 5/1996 | Japan . |
| 95/10903 | 4/1995 | WIPO . |

Primary Examiner—Chi H. Pham
Assistant Examiner—Brenda H. Pham
Attorney, Agent, or Firm—Ostrolenk, Faber, Gerb & Soffen, LLP

[57] ABSTRACT

A receiver of a CDMA system using a spread spectrum scheme is provided, which, particularly in a case where the RAKE synthesis is performed, stably extracts path timings to be synthesized and realize a reliable RAKE synthesis. Self correlation of a replica of a spreading code is calculated on the side of the receiver and an upper and lower threshold values obtained by incorporating the self correlation value thus calculated in an error range corresponding to a receiving signal quality are used as judge references for judging an output of a searcher circuit. When the output of the searcher circuit is within a range defined by the upper and lower threshold values, it is deemed as an invalid correlation value due to self correlation and, when the output of the searcher circuit is out of the range, it is deemed as effective path timing to be synthesized.

2 Claims, 2 Drawing Sheets

RECEIVER

BACKGROUND OF THE INVENTION

1. Field of the Invention

The present invention relates to a receiver for use in a spread spectrum communication system and, particularly, to a receiver for use in a CDMA (code division multiple access) communication system for modulating an information signal with a spreading code which is a signal having a rate several tens to several hundreds times a rate of the information signal and transmitting the modulated information signal.

2. Description of Related Art

One of related prior art is disclosed in, for example, Japanese Patent Application Laid-open No. H8-116303, entitled "Spread Spectrum Radio Communication System and Radio Communication Devices for Use in a Base Station and Mobile Stations of the Communication System", especially in line 10 of page 12 to line 47 of page 13 and in FIG. 10 of that desclosure.

A receiver for use in a CDMA system utilizing a spread spectrum scheme requires a searcher circuit for continuously catching a timing of the spreading code contained in a receiving signal such that a receiving can be performed on the side of the receiver with an appropriate timing. The timing of the spreading code is usually obtained by calculating a mutual correlation between the receiving signal and a replica of the spreasing code on the side of a transmitter. Since the value of mutual correlation becomes maximum when the timing of the spreading code exactly coincident with the receiving timing, the receiver can know the timing of the spreading code of the receiving signal by monitoring the mutual correlation value.

Further, the receiver receives a receiving signal through a RAKE synthesis performed on the basis of an output value of the searcher circuit. In the signal receiving through the RAKE synthesis, the quality of receiving signal is maintained by demodulating signal components passed through a plurality of signal paths having different time delays and received by the receiver at timings corresponding to the time delays and synthesizing the demodulated signal components.

FIG. 1 shows a construction of the receiver disclosed in the Japanese Patent Application Laid-open No. H8-116303, as a typical example of the RAKE receiver. The receiver shown in FIG. 1 is constructed with an antenna 201, a radio frequency demodulator circuit 202, finger circuits 203a to 203n, a finger information extractor 204 and a symbol synthesizer 205.

Now, an operation of this prior art receiver will be described with reference to FIG. 1. A receiving signal received at the antenna 201 is converted into a baseband signal by the radio frequency demodulator circuit 202. When an information of an optimal number of fingers incomes to the receiver from a related transmitting side, the information is extracted by the finger information extractor 204 having a searcher function. The finger information extractor 204 determines one of the finger circuits 203a to 203n which is to be operated, according to the optimal finger number information and sends an operation control signal to the respective finger circuits. When the optimal finger number information indicates a large number, signal components passed through a plurality of paths can be received and reproduced efficiently by a corresponding number of finger circuits. On the contrary, when the optimal number of fingers contained in the optimal finger number information is small and the number of paths is small, unnecessary reproduction and synthesis of noise is prevented and it is possible to maintain S/N ratio high. Although, in the Japanese Patent Application Laid-open No. H8-116303, the optimal finger number information is informed by the other side of the communication after a formation of radio linkage therebetween and before a start of communication, it is also disclosed that the optimal finger number information may be informed periodically or with an arbitrary timing from the other side of communication even after the communication is started.

In the above mentioned prior art, however, reliability of the notice of finger number information from the other side of communication is a problem and an effective RAKE receiving is impossible. It is described in the Japanese Patent Application Laid-open No. H8-116303 that the number of fingers can be changed as occasion may demand. In such case, however, there is a possibility that an information of change of the finger number is received erroneously since the information is noticed after a degradation of receiving condition is started.

Further, the mutual correlation between the receiving signal and the replica of the spreading code may have some value even at a time outside the correct timing due to self correlation characteristics of the spreading code. Therefore, there is a possibility that, when the RAKE receiving is performed by using such mutual correlation value, a timing outside the delay time of a normal path is erroneously deemed as a timing with which the RAKE synthesis is to be performed. Since it is impossible to obtain the expected effect of RAKE synthesis when the synthesis is performed with such erroneous timing, the receiving signal quality is degraded.

On the contrary, when a timing with large self-correlation value is preliminarily deemed as erroneous and a path with that timing is neglected, an effective path having such timing may be disregarded and thus the advantages of the RAKE receiver will be lost.

The present invention was made in view of the above mentioned defects of the prior art and has an object to provide a receiver of a CDMA system utilizing a spread spectrum scheme and, particularly, a receiver which realizes a reliable RAKE synthesis by stably extracting a path timing to be synthesized.

SUMMARY OF THE INVENTION

According to the present invention, a receiver includes spreading code generator means for generating a replica of a spreading code used on a transmitter side, searcher means for calculating a mutual correlation between the replica generated by the spreading code generator means and a receiving signal and obtaining a spreading code timing of the receiving signal and inverse spread means for inverse-spreading the receiving signal with the thus obtained spreading code timing by using the replica generated by the spreading code generator means and is featured by further comprising means for obtaining a self-correlation value of the replica generated by the spreading code generator means and processing means for processing the self-correlation value as an invalid correlation value when the mutual correlation calculated by the searcher means is within a predetermined range with respect to an upper and lower threshold values obtained by incorporating in the thus obtained self-correlation value an error range corresponding to a receiving signal quality.

The searcher means preferably includes a sliding correlator which obtains mutual correlation between the replica of the spreading code and the receiving signal for one symbol while shifting one of them by 1/n with respect to the other, where n is an arbitrary integer, and outputs timings of a predetermined number of correlation values and ratios thereof with respect to the maximum correlation value of them in the order of correlation value. The inverse spread means preferably includes means for branching the receiving signal and delaying the branched receiving signals correspondingly to the respective timings output by the sliding correlator, means for inverse-spreading the branched and delayed receiving signals by using the replica generated by the spreading code generator means, weighing means for weighing the inverse-spread signals with values of the ratios output from the sliding correlator and means for synthesizing the weighted signals. The processing means preferably includes means for resetting the weight set to the corresponding inverse-spreaded signal by the weighing means to zero when the value of the ratio output from the sliding correlator is within the range defined by the upper limit value and the lower limit value.

The self correlation value of the spreading code depends primarily upon one spreading code. In the present invention, the self correlation of the replica of the spreading code is calculated and a numerical value obtained by incorporating an error range corresponding to the receiving signal quality in the calculation result is made as a threshold value, on the side of the receiver, which threshold value is used as a determination reference for the output of the searcher circuit. The output of the searcher circuit is deemed as an ineffective correlation value caused by self correlation when the value of the output of the searcher circuit is within the range defined by the upper and lower limits which are obtained by adding the error range to the self correlation value of the replica and is deemed as an effective path timing to be synthesized when the output value is out of the range.

With the construction as mentioned above, the searcher circuit does not extract erroneous timing due to self correlation of the spreading code. Further, if an effective signal exists in a position corresponding to an erroneous timing due to self correlation, the mutual correlation value of that signal has a value different from the self correlation value of the spreading code. However, it becomes possible to exclude the influence of self correlation value and to reliably select the path by providing the threshold values due to self correlation value. Therefore, only signals passed through the effective paths are synthesized in the RAKE receiving and thus the receiving signal quality can be maintained or improved.

Preferred embodiments of the present invention will be described with reference to the accompanying drawings.

DETAILED DESCRIPTION OF PREFERRED EMBODIMENTS

Figure 1:
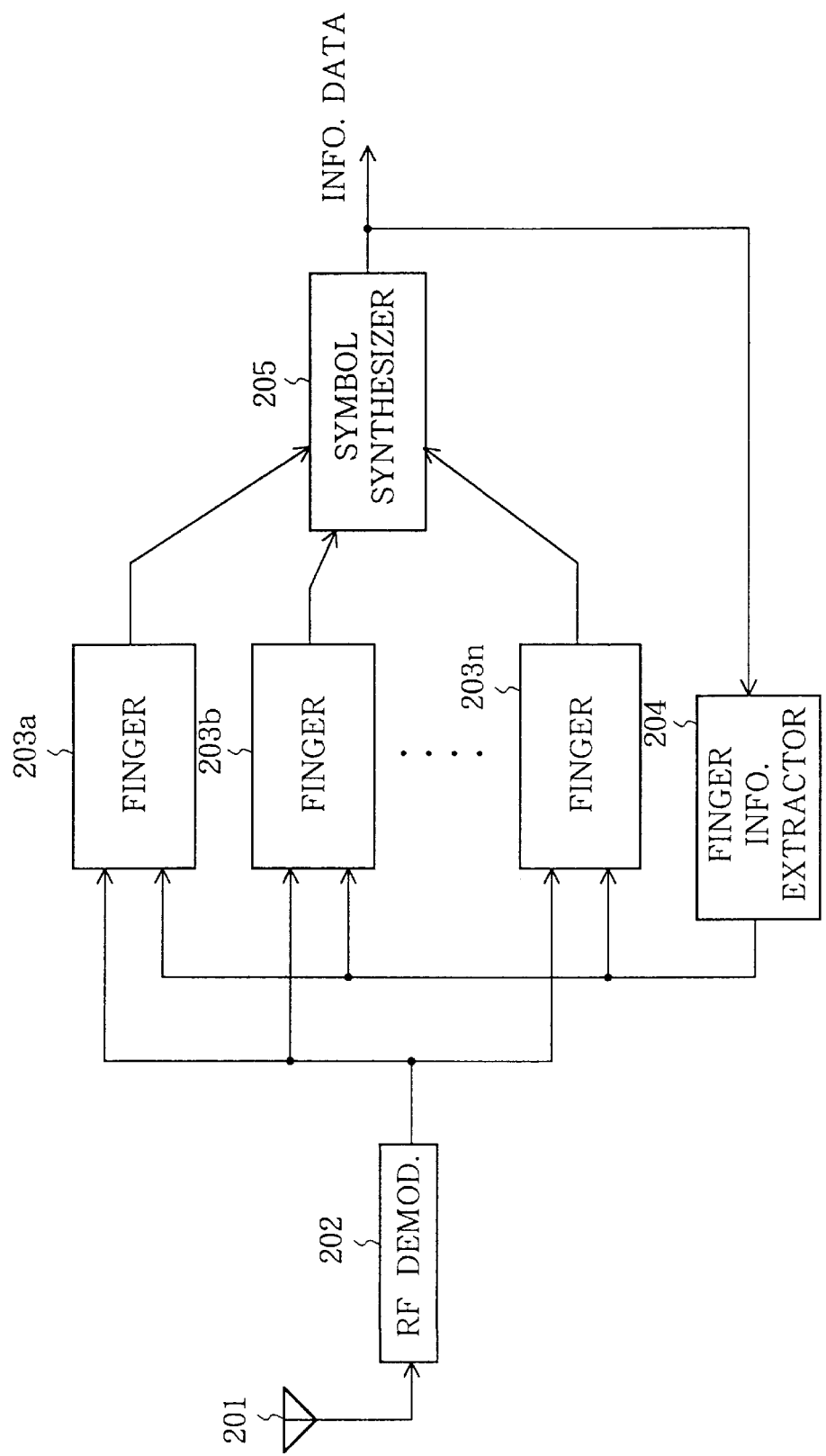
FIG. 1 is a block circuit diagram showing a circuit construction of a conventional transceiver.
Figure 2:
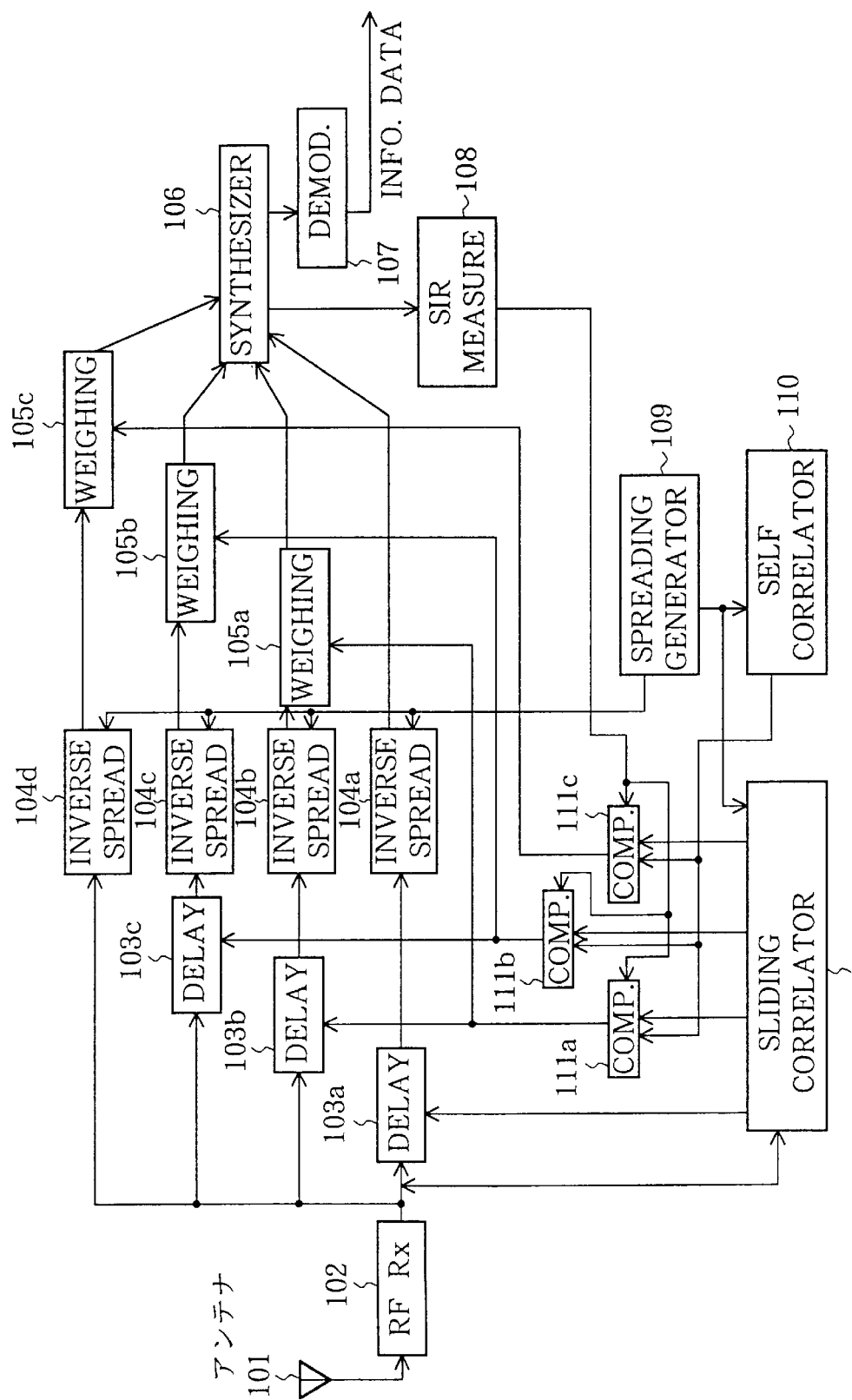
FIG. 2 is a block circuit diagram showing a circuit construction of a receiver on the side of a base station according to an embodiment of the present invention.

FIG. 2 shows a circuit construction of a receiver according to an embodiment of the present invention. In this embodiment, the circuit is constructed such that it can synthesize up to 4 signals arriving at the receiver at different times. This receiver is constructed with an antenna 101, a radio receiver unit 102, delay circuits 103a~103c, inverse spread units 104a~104d, weighing circuits 105a~105c, a synthesizer unit 106, a demodulator 107, a signal wave receiving power to interfering wave receiving power ratio (SIR) measuring unit 108, a spreading code generator 109, a self correlator 110, comparators 111a~111c and a sliding correlator 112 as a searcher circuit.

Now, an operation of the receiver will be described. A receiving signal received by the antenna 101 is input to the radio receiver unit 102 in which a carrier of the receiving signal is removed. The receiving signal output from the radio receiver unit 102 is branched to 4 signal components 3 of which are delayed by the delay circuits 103a~103c, respectively. The delayed signal components are input to the inverse spread units 104a~104c, respectively. The remaining signal component is input to the inverse spread unit 104d without delay. In the inverse spread units 104a~104d, inverse spread of the receiving signal components is performed with using a replica of a spreading code used on the side of a transmitter to demodulate secondary modulations thereof The inverse spreaded signal components output from the inverse spread units 104b~104d are weighted with weights corresponding to receiving levels thereof in the weighing circuits 105a~105c, respectively. Then, correlation values obtained through the sliding correlator 112 and the comparators 111a~111c, which are to be described in more detail later, and the receiving signal components output from the inverse spread units 104b~104d corresponding thereto are multiplied in the weighing circuits 105a~105c, respectively, and the results from the weighing circuits 105a to 105c and the output of the inverse spread unit 104a are added in the synthesizer unit 106. Incidentally, the output of the inverse spread unit 104a is directly supplied to the synthesizer unit 106 since it is always weighted with 1.

The SIR measuring unit 108 calculates the signal wave receiving power to interfering wave receiving power ratio (SIR) on the basis of the signal components after synthesized. The SIR measuring unit 108 provides a ratio of an interfering wave level which is obtained by subtracting a sum of powers of the synthesized signal components which are in-phase from a total power of the synthesized signal components to a signal wave level which is the sum of the powers of the in-phase signal components after synthesized.

The output of the radio receiver unit 102 is input to the sliding correlator 112. In the sliding correlator 112, a mutual correlation value for one symbol between the replica of the spreading code generated by the spreading code generator 109 and used on the side of the transmitter and the receiving signal while mutually shifting the replica and the receiving signal by 1/n chips (n is an arbitrary integer). Timing of the mutual correlation values thus obtained are represented by t1, t2, t3 and t4 in the value order. Thus, when a delaying direction on a time axis is represented by positive number, t1<t2<t3<t4. Further, the correlation values are represented by s1, s2, s3 and s4 in the value order. These correlation values and the timing are set in the delay circuit 103a and the comparators 111a to 111c as described below.

First, delay time Ta=t4−t1 is set in the delay circuit 103a as an information of the maximum path signal. Further, Tb=t4−t2 and Tx=t2−t1 and s2/s1 are set in the comparator 111a as delay times and ratio of correlation values, respectively. Similarly, Tc=t4−t3 and Ty=t3−t1 and s3/s1 are set in the comparator 111b and Tz=t4−t1 and s4/s1 are set in the comparator 111c. The delay times Ta, Tb and Tc are signals indicative of amount of delay of the receiving signal components in the respective delay circuits 103b to 103c. The delay times Tx, Ty and Tz are signals indicative of time relation between a main wave and a delayed wave of the signal arrived at the receiver.

In the self correlator 110, the spreading codes generated by the spreading code generator 109 are multiplied and summed while shifting the spreading code by 1/n chips as in the case of the sliding correlator 112 to obtain the self correlation value of the spreading code for 1 symbol. The self correlation value is represented by relative time difference having a positive numerical value in a delaying direction of time with a time when a difference in timing is set to zero and its level when the timing deviation is made zero is represented by 1. In the comparators 111a to 111c, the self correlation values obtained by the sliding correlator 112 correspondingly to the respective timings Tx, Ty and Tz are selected from the output of the self correlator 110. The comparators 111a to 111c calculate an error range of the self correlation value from the SIR representing the receiving signal quality information as the upper and lower threshold values. Representing the SIR by r and the self correlation value by V, the upper threshold value z1 and the lower threshold value z2 are represented by $z1=V\times(1+1/r)$ and $z2=V\times(1-1/r)$, respectively. The comparators 111a to 111c compare the calculated upper and lower threshold values with the levels of the ratios s2/s1, s3/s1 and s4/s1 of the correlation values output from the sliding correlator 112 and, when the latter levels are within the range defined by the upper and lower threshold values, the paths corresponding thereto are judged as ineffective paths and the weighing coefficient 0 is set in the weighing circuits 105a to 105c corresponding thereto such that the RAKE synthesis is not performed. In this case, the delay time of the delay circuit in the finger which is set with the weighing coefficient 0 is made 0 (no delay). On the other hand, when the levels are out of the range, the paths corresponding thereto are judged as effective paths and the delay times Ta, Tb and Tc thereof are set in the delay circuits 103a to 103c and the weighing circuits 105a to 105c corresponding thereto are set with the ratios s2/s1, s3/s1 and s4/s1 of the correlation values, respectively.

For example, when the four correlation values calculated by the sliding correlator 112 are s1=10 with the timing t1=1 chip, s2=8 with the timing t2=2 chips, s3=4 with the timing t3=4 chips and s4=2 with the timing t4=8 chips, the delay time Ta=7 chips is set in the delay circuit 103a as the information of maximum path signal. In the comparator 111a, Tb=6 chips and Tx=1 chip are set as the delay times and 0.8 is set as the ratio of correlation values. In the comparator 111b, Tc=4 chips and Ty=3 chips are set as the delay times and 0.4 is set as the correlation value ratio and, in the comparator 111c, Tz=7 chips is set as the delay time and 0.2 is set as the correlation value ratio.

In this case, when the self correlation values at the timings Tx, Ty and Tz of the spreading codes assigned to its own station are Vx=0.79, Vy=0.2 and Vz=0.05 and SIR=10, the upper limit values and the lower limit values at the respective timings become Z1x=0.88, Z2x=0.72, Z1y=0.44, Z2y=0.36, Z1z=0.22 and Z2z=0.18, respectively, and Vx=0.79 is judged as being within the range defined by the upper and lower limits. In such case, the delay circuit 103b is set with delay time 0, the weighing circuit 105a is set with weighing coefficient 0 and the delay circuit 103c is set with delay time for 4 chips, and the weighing circuit 105b is set with weighing coefficient 0.4 and the weighing circuit 105c is set with the weighing coefficient 0.2. Therefore, the signal having the timing Tx is excluded for RAKE synthesis.

The respective receiving signal components whose signal arriving times are regulated by the delay circuits 103a to 103c and which are weighted appropriately by the weighing circuits 105a to 105c are added and synthesized by the synthesizer unit 106. The added and synthesized signal is detected by the demodulator 107 to demodulate the primary modulation and the information data is extracted.

As described, according to the present invention, it is possible to realize an effective RAKE synthesis receiving of a signal in one station of the communication without necessity of information from the other side station by judging the signal with using the threshold values provided in the searcher circuit correspondingly to the receiving signal quality.

Further, since it becomes possible to automatically judge whether the output of the sliding correlator is with an erroneous timing due to self correlation of the spreading code or a timing of an effective path, it is possible to solve the conventional problem, that is, the problem that even effective path may be excluded because the timing having large self correlation is deemed as erroneous timing and the path having that timing is neglected. Further, since, in the RAKE receiving, only the effective paths are synthesized, there is no degradation of the receiving signal quality which occurs when the paths having timings erroneously detected due to self correlation of the spreading code are RAKE-synthesized and thus the receiving signal quality can be maintained or improved.

What is claimed is:

1. A receiver for use in a CDMA system comprising:

spreading code generator means for generating a replica of a spreading code used on the side of a transmitter;

searcher means for obtaining a spreading code timing of a receiving signal by calculating a mutual correlation between the replica produced by said spreading code generator means and the receiving signal;

inverse spread means for inverse-spreading the receiving signal with the spreading code timing obtained by said searcher means by using the replica generated by said spreading code generator means;

means for obtaining a self correlation of the replica generated by said spreading code generator means; and processing means for processing the self-correlation value as an invalid correlation value when the mutual correlation calculated by said searcher means is within a predetermined range with respect to an upper and lower threshold values obtained by incorporating in the thus obtained self-correlation value an error range corresponding to a receiving signal quality.

2. A receiver as claimed in claim 1, wherein said searcher means includes a sliding correlator which obtains mutual correlation between the replica of the spreading code and the receiving signal for one symbol while shifting one of them by 1/n with respect to the other, where n is an arbitrary integer, and outputs timings of a predetermined number of correlation values and ratios thereof with respect to the maximum correlation value of them in the order of correlation value; wherein said inverse sread means includes means for branching the receiving signal and delaying the branched receiving signals correspondingly to the respective timings output by said sliding correlator, means for inverse-spreading the branched and delayed receiving signals by using the replica generated by said spreading code generator means, weighing means for weighing the inverse-spreaded signals with values of the ratios output from said sliding correlator and means for synthesizing the weighted signals; and wherein said processing means includes means for resetting the weight set to the corresponding inverse-spreaded signal by said weighing means to zero when the value of the ratio output from said sliding correlator is within the range defined by the upper limit value and the lower limit value.

* * * * *